(12) United States Patent
Sheem et al.

(10) Patent No.: US 6,399,250 B1
(45) Date of Patent: Jun. 4, 2002

(54) NEGATIVE MATERIAL FOR RECHARGEABLE LITHIUM BATTERY AND METHOD OF PREPARING THE SAME

(75) Inventors: Kyou-Yoon Sheem; Sang-Young Yoon; Jeong-Ju Cho; Wan-Uk Choi, all of Chungcheongnam-do (KR)

(73) Assignee: Samsung Display Devices Co., Ltd. (KR)

( * ) Notice: Subject to any disclaimer, the term of this patent is extended or adjusted under 35 U.S.C. 154(b) by 0 days.

(21) Appl. No.: 09/448,327

(22) Filed: Nov. 23, 1999

(30) Foreign Application Priority Data

Nov. 25, 1998 (KR) .............................. 98-50652

(51) Int. Cl.⁷ .............................. H01M 10/24
(52) U.S. Cl. .............................. 429/231.8; 429/231.95
(58) Field of Search ........................ 252/502; 423/414; 429/218.1, 231.8

(56) References Cited

U.S. PATENT DOCUMENTS 4,770,825 A  * 9/1988  Sara .......................... 264/29
5,698,341 A  * 12/1997  Tamaki et al. .............. 429/218
6,156,457 A  * 12/2000  Tamaki et al. .............. 429/218

FOREIGN PATENT DOCUMENTS

| JP | 03182296 | 2/1993 |
| JP | 07232071 | 8/1995 |
| JP | 07127574 | 11/1996 |
| JP | 07232072 | 3/1997 |

* cited by examiner

Primary Examiner—Gabrielle Brouillette
Assistant Examiner—M. Wills
(74) Attorney, Agent, or Firm—Blakely Sokoloff; Taylor & Zafman

(57) ABSTRACT

A negative active material for a rechargeable lithium battery having the high content of boron is provided. A mixed solution including a pitch, a boron compound and a solvent is prepared and the solvent is removed from the mixed solution to prepare mesophase pitch. The mesophase pitch is then carbonized and the carbonized material is graphitized to obtain the negative active material.

11 Claims, 2 Drawing Sheets

NEGATIVE MATERIAL FOR RECHARGEABLE LITHIUM BATTERY AND METHOD OF PREPARING THE SAME

CROSS REFERENCE TO RELATED APPLICATION

This application is based on application Ser. No. 98-50652 filed in the Korean Industrial Property Office on Nov. 25, 1998, the content of which is incorporated hereinto by reference.

BACKGROUND OF THE INVENTION (a) Field of the Invention

The present invention relates to a negative active material for a rechargeable lithium battery and a method of preparing the same and, more particularly, to a negative active material for a rechargeable lithium battery which is doped with boron.

(b) Description of the Related Art

Metallic lithium has been used for negative active material in a rechargeable lithium battery. However, lithium metal has good reactivity toward electrolyte and deposits to form a dendric layer which increases the reactivity of lithium. There are at least two disadvantageous effects that arise from the reaction of lithium with electrolyte: the exothermic liberation of heat and the formation of passive films on lithium has been shown to be one reason for the loss of capacity of lithium cells on repeated cycling.

The problem of lithium reactivity toward the electrolyte is addressed by replacing lithium metal with carbon-based materials. With the use of carbon-based active materials, the potential safety problem present in metallic lithium-based batteries can be prevented while achieving a relatively higher energy density as well as the reasonable shelf life.

The carbon-based materials can be largely classified into two categories crystalline graphite and amorphous carbon. Among the crystalline carbon-based material, artificial graphite has the desired properties such as ability to control density and interlayer spacing by adjusting the temperature of the heat treatment. Artificial graphite is prepared by heat-treating petroleum pitch, coal pitch, polymer-based pitch or soft carbon at 2600–3000° C. Alternatively, doping with boron as catalyst may increase the capacity of coke type materials to a suitable degree. Several methods are disclosed to increase the catalyst content in the resulting graphite structure since the catalyst content acts as a critical factor in obtaining the desired crystalline structure.

Japanese Patent Laid-open No. 9-63584, 9-63585 and 8-306359 disclose methods in which a boron compound is doped in carbon fiber or graphite, after which the boron-doped carbon fiber or graphite is heated. Although these methods are simple, the boron remains on the surface of the carbon fiber or graphite because boron is directly mixed with carbon fiber or graphite without the use of any solvent. Accordingly, boron is not introduced into the graphite but rather is physically mixed with graphite. To increase the content of boron relative to the carbon-based material, the size of carbon-based material and that of the boron should be decreased. However, small carbon-based materials, particularly carbon fiber can used for an active material. That is, there is a limit to the decrease in the size of carbon-based material.

Japanese Patent Laid-Open No. 5-26680 discloses a method in which boric acid, used as boron compound, is added to petroleum pitch and the mixture is heat-treated. Using the method, boron is better introduced into graphite without the use of a solvent. That is, a wet method is utilized in this process, whereas mixing method without a solvent is referred to as a dry method. However, it is still necessary in this method to increase the content of boron in the carbonaceous material.

There is also proposed a method in which a gaseous low molecular carbon-based materials react with a gaseous boron-based compound by using a CVD (chemical Vapor Deposition) process. The CVD process can dope boron in the graphite, but the method is complicated and the production costs are high.

SUMMARY OF THE INVENTION

It is an object of the present invention to provide a negative active material for a rechargeable lithium battery having a high content of boron which is uniformly doped in the negative active material.

It is another object to provide a method of preparing a negative active material for a rechargeable lithium battery which is simple and inexpensive to produce.

These and other objects may be achieved by a negative active material for a rechargeable lithium battery and a method of preparing the same. The method includes the steps of preparing a mixed solution including a pitch, a boron-based compound and a solvent, removing the solvent from the mixed solution, heat-treating the resulting mixture to produce a mesophase pitch, carbonizing the mesophase pitch and graphitizing the carbonized mesophase pitch.

The negative active material includes 0.1 to 10 wt % of boron. The negative active material has an planar distance of $d_{002} \leq 3.40$ Å of X-ray diffraction plane distance at the (002) plane and a crystallinity size in the direction of the c axis of $Lc \geq 400$ Å. The present invention further provides a negative active material for a rechargeable lithium battery including shapeless graphite, which has an edge rolled with an onion sheath structure such that an interlayer spacing of the graphite is closed.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

Figure 1:
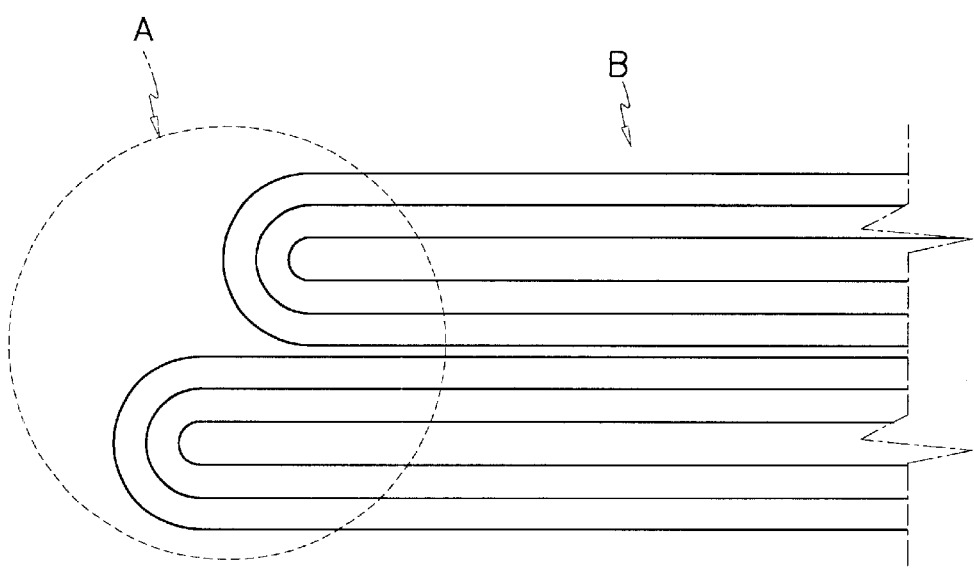
FIG. 1 is a side cross sectional view of negative active material for a rechargeable lithium battery according to an example of the present invention.

The present invention provides a method of preparing a negative active material for a rechargeable lithium battery. In the present invention, a pitch is mixed with a boron compound with solvents. As a result, boron is uniformly doped in the carbon-based material and the content of boron in the carbon-based material is increased.

A negative active material preparation will be illustrated in more detail.

A pitch and a boron-based compound are dissolved in a solvent to prepare a mixed solution. The solvent can be selected from any solvent material capable of dissolving both the pitch and boron-based compound. For example, tetrahydrofuran or toluene may be used for the solvent. The amount of the boron-based compound is 0.1 to 10 wt % of the pitch.

Alternatively, a pitch is dissolved in a first solvent to prepare a first solution. The first solvent can be selected from any solvent material capable dissolving only pitch. For example, tetrahydrofuran, toluene, quinoline, pyridine, benzene or hexane may be used for the first solvent. It is preferably to use tetrahydrofuran, toluene, quinoline or pyridine to which the pitch has good solubility. A boron-based compound is dissolved in a second solvent to prepare a second solution. The second solvent can be selected from any solvent material capable of dissolving only the boron-based compound. For example, alcohol such as ethanol, methanol or isopropyl alcohol may be used for the second solvent. The first solution is mixed with the second solution to result in a mixed solution. Preferably, the first solvent has compatibility to the second solvent. The pith may be a coal pitch, a petroleum pitch, polymer pitch, polymer or the mixture thereof. The boron-based compound may be $H_3BO_3$, $B_2O_3$ or the mixture thereof.

The mixed solution is evaporated to remove the solvent. As a result, a boron-included pitch is produced. The boron-included pitch is heat-treated at 300 to 450° C. for 10 to 20 hours to prepare a mesophase pitch. If the heat-treated temperature is out of the above range, the mesophase pitch is not desirably formed and the crystallinity of the final active material is reduced.

The mesophase pitch is carbonized at 1000 to 1700° C. The carbonized pitch is then milled and sieved to collect a material of a suitable size for use as an active material. The sieved material is graphitized at 2200 to 2800° C., preferably 2200 to 2600° C.

Alternatively, for producing the active material in the form of fiber, the mesophase pitch is melt-formed. The melt-forming step includes melt spinning or melt blowing. The fibrous active material is hardened. The hardening step is performed by increasing the temperature from 330 to 370° C., preferably 350° C. at a rate of 3 to 5° C./min for 2 hours in an air atmosphere. At this time, oxygen in the air is introduced into a molecular structure of a surface of the fibrous material to cross-link with the surface. As a result, the surface of the fibrous material is stabilized. The hardened fibrous material is milled and sieved to collect a fibrous material preferably within the range of 25 to 45 μm which is suitable for use as an active material. The fibrous material is then carbonized at 1000 to 1700° C. and the carbonized material is graphitized at 2200 to 2800° C., preferably, 2200 to 2600° C.

In the graphitization step, the ambient atmosphere may induce an adverse effect on the performance and productivity of the active material. If the graphitization step is performed in an air atmosphere, oxygen in the air reacts with the carbonaceous material, thereby generating gases such as carbon dioxide and reducing the degree of graphitization. Furthermore, when the boron is coated on a surface of the carbonaceous material and graphitized in an air atmosphere, boron reacts with nitrogen in the air to thereby form boron nitride. In this case, the battery performance of the active material may be reduced. In the present invention, because boron is uniformly doped on and in the carbonaceous material, a trace of boron and the excess of carbon exist on the surface of the carbonaceous material. Owing to the excess of carbon on the surface of the carbonaceous material, the content of boron with nitrogen does not easily occur such that boron nitride is not formed, thereby preventing the deterioration in the battery performance. In the preparation method of the present invention, although boron nitride is not formed on the active material in an air atmosphere, it is nevertheless preferable that the method is performed under an air (oxygen) free atmosphere.

The produced active material has 0.1 to 10 wt % of boron. If the content of boron exceeds 10 wt %, boron carbide, which causes the decreases in the capacity of the battery, is generated.

Figure 2:
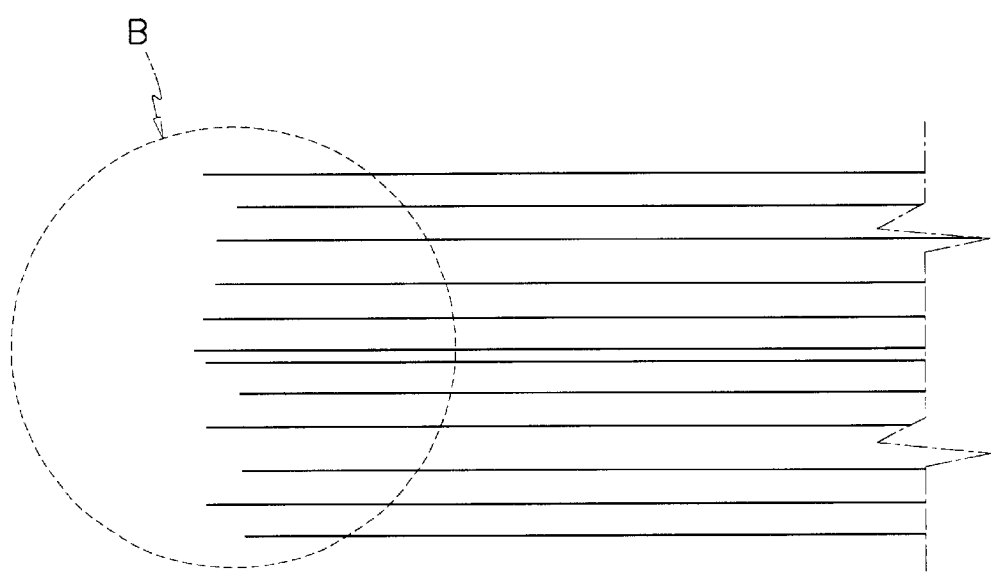
FIG. 2 is a side cross sectional view of a negative active material for a rechargeable lithium battery according to a comparative example of the present invention.

During X-ray-diffraction analysis, the active material displays a planar distance of $d_{002} \leq 3.40$ Å at a (002) plane and a crystallinity size in the direction of a c axis of $Lc \geq 400$ Å. An edge (B) of the conventional active material is exposed to electrolyte as shown in FIG. 2. Whereas, as shown in FIG. 1, the active material of the present invention has an edge (A) rolled with an onion structure sheath structure. Accordingly, an interlayer spacing of the active material is closed. In the application, the onion structure indicates that the layered structure of the active material has a gap, and the gap is closed by doping boron to the active material. Accordingly, side reactions between the active material and electrolyte hardly occur during the initial charge and discharge when compared with the active material of the conventional active material, an edge portion of which is exposed to electrolyte.

Since it is possible for those in the art to manufacture a rechargeable lithium battery by the conventional process using the negative active material of the present invention, a detailed description will be omitted herein.

In the rechargeable lithium battery, a positive active material may be a lithium transition oxides such as $LiCoO_2$, $LiNiO_2$, $LiMn_2O_4$, $LiNi_xCo_{1-x}O_y$ (0<x<1, 0<y≦2). A separator may be a polypropylene-based porous polymer and an electrolyte may be a lithium salt such as $LiPF_6$ or $LiClO_4$ in an organic solvent such as ethylene carbonate or dimethyl carbonate. In the rechargeable lithium battery using the negative active material of the present invention, propylene carbonate which has good low temperature characteristics may be used as the organic solvent. Propylene carbonate generally can not be used for the organic solvent because propylene carbonate has good reactivity with the conventional negative active material, decreasing capacity of the battery.

The following examples further illustrate the present invention.

EXAMPLE 1

Coal pitch was treated with tetrahydrofuran to remove the tetrahyrdofuran-insoluble components. As a result, tetrahydrofuran-soluble pitch obtained. 80 g of the tetrahydrofuran-soluble pitch and $H_3BO_3$ were added to 2 l of tetrahydrofuran solvent to prepare a mixed solution. At this time, the amount of $H_3BO_3$ was 5 wt % of the soluble pitch. The mixed solution was evaporated to remove tetrahydrofuran. The resulting mixture was heat-treated at 430° C. for 15 hours in an inert gaseous atmosphere to produce a mesophase pitch. The mesophase pitch was carbonized at 1000° C. for 2 hours to prepare a coke. The coke was milled and the milled coke was sieved to collect a resulting material having a size of 25 to 45 μm. The resulting material was graphitized at 2800° C. in an argon atmosphere. As a result, a boron-doped carbonaceous active material was obtained.

EXAMPLE 2

A boron-doped carbonaceous active material was produced by the same procedure in Example 1 except that the graphitizing step was performed at 2600° C.

EXAMPLE 3

A boron-doped carbonaceous active material was produced by the same procedure in Example 1 except that the graphitizing step was performed at 2400° C.

EXAMPLE 4

A boron-doped carbonaceous active material was produced by the same procedure in Example 1 except that the graphitizing step was performed at 2200° C.

EXAMPLE 5

A boron-doped carbonaceous active material was produced by the same procedure in Example 1 except that the amount of $H_3BO_3$ was 3 wt % of the tetrahydrofuran-insoluble pitch.

EXAMPLE 6

A boron-doped carbonaceous active material was produced by the same procedure in Example 2 except that the amount of $H_3BO_3$ was 3 wt % of the tetrahydrofuran-insoluble pitch.

EXAMPLE 7

A boron-doped carbonaceous active material was produced by the same procedure in Example 3 except that the amount of $H_3BO_3$ was 3 wt % of the tetrahydrofuran-insoluble pitch.

EXAMPLE 8

A boron-doped carbonaceous active material was produced by the same procedure in Example 4 except that the amount of $H_3BO_3$ was 3 wt % of the tetrahydrofuran-insoluble pitch.

EXAMPLE 9

A boron-doped carbonaceous active material was produced by the same procedure in Example 1 except that the amount of $H_3BO_3$ was 1 wt % of the tetrahydrofuran-insoluble pitch.

EXAMPLE 10

A boron-doped carbonaceous active material was produced by the same procedure in Example 2 except that the amount of $H_3BO_3$ was 1 wt % of the tetrahydrofuran-insoluble pitch.

EXAMPLE 11

A boron-doped carbonaceous active material was produced by the same procedure in Example 3 except that the amount of $H_3BO_3$ was 1 wt % of the tetrahydrofuran-insoluble pitch.

EXAMPLE 12

A boron-doped carbonaceous active material was produced by the same procedure in Example 4 except that the amount of $H_3BO_3$ was 1 wt % of the tetrahydrofuran-insoluble pitch.

COMPARATIVE EXAMPLE 1

Coal pitch was treated with tetrahydrofuran to remove the tetrahyrdofuran-insoluble components. As a result, tetrahydrofuran-soluble pitch was obtained. The tetrahydrofuran-soluble pitch was heat-treated at 30° C. for 15 hours to produce a mesophase pitch. The mesophase pitch was carbonized at 1000° C. for 2 hours. The carbonized material was milled and the milled material was sieved to collect a resulting material having a size of 25–45 µm. The collected material was graphitized at 2800° C. for 30 minutes in an argon atmosphere. As a result, a carbonaceous material was obtained.

COMPARATIVE EXAMPLE 2

A carbonaceous material was produced by the same procedure in Comparative example 1 except that the graphitizing step was performed at 2600° C.

COMPARATIVE EXAMPLE 3

A carbonaceous material was produced by the same procedure in Comparative example 1 except that the graphitizing step was performed at 2400° C.

COMPARATIVE EXAMPLE 4

A carbonaceous material was produced by the same procedure in Comparative example 1 except that the graphitizing step was performed at 2200° C.

COMPARATIVE EXAMPLE 5

Coal pitch was treated with tetrahydrofuran to remove the tetrahyrdofuran-insoluble components. As a result, tetrahydrofuran-soluble pitch was obtained. The tetrahydrofuran-soluble pitch was heat-treated at 30° C. for 15 hours and was carbonized at 1000° C. for 2 hours. The carbonized material was milled and the milled material was sieved to collect a resulting material having a size of 25–45 µm. $H_3BO_3$ corresponding to 5 wt % of the soluble-pitch was added to the collected material. The resulting mixture was graphitized at 2800° C. for 30 minutes in an argon atmosphere. As a result, a boron-doped carbonaceous active material was obtained.

COMPARATIVE EXAMPLE 6

A boron-doped carbonaceous active material was produced by the same procedure in Comparative example 5 except that the graphitizing step was performed at 2600° C.

COMPARATIVE EXAMPLE 7

A boron-doped carbonaceous active material was produced by the same procedure in Comparative example 5 except that the graphitizing step was performed at 2400° C.

COMPARATIVE EXAMPLE 8

A boron-doped carbonaceous active material was produced by the same procedure in Comparative example 5 except that the graphitizing step was performed at 2200° C.

COMPARATIVE EXAMPLE 9

A boron-doped carbonaceous active material was produced by the same procedure in Comparative example 5 except that the amount of $H_3BO_3$ was 3 wt % of the soluble pitch.

COMPARATIVE EXAMPLE 10

A boron-doped carbonaceous active material was produced by the same procedure in Comparative example 6 except that the amount of $H_3BO_3$ was 3 wt % of the soluble pitch.

COMPARATIVE EXAMPLE 11

A boron-doped carbonaceous active material was produced by the same procedure in Comparative example 7 except that the amount of $H_3BO_3$ was 3 wt % of the soluble pitch.

COMPARATIVE EXAMPLE 12

A boron-doped carbonaceous active material was produced by the same procedure in Comparative example 8 except that the amount of $H_3BO_3$ was 3 wt % of the soluble pitch.

COMPARATIVE EXAMPLE 13

A boron-doped carbonaceous active material was produced by the same procedure in Comparative example 5 except that the amount of $B_2O_3$ was 1 wt % of the soluble pitch.

COMPARATIVE EXAMPLE 14

A boron-doped carbonaceous active material was produced by the same procedure in Comparative example 6 except that the amount of $B_2O_3$ was 1 wt % of the soluble pitch.

COMPARATIVE EXAMPLE 15

A boron-doped carbonaceous active material was produced by the same procedure in Comparative example 7 except that the amount of $B_2O_3$ was 1 wt % of the soluble pitch.

COMPARATIVE EXAMPLE 16

A boron-doped carbonaceous active material was produced by the same procedure in Comparative example 8 except that the amount of $B_2O_3$ was 1 wt % of the soluble pitch.

The X-ray planar distance of $d_{002}$ of the carbonaceous materials of Examples 1 to 12 and Comparative examples 1–4 were determined and the results are presented in Table 1. Furthermore, each of the carbonaceous materials according to Examples 1 to 12 and comparative examples 1–16, 10 wt % of a polyvinylidene fluoride binder and N-methyl pyrrolidone were mixed to be thereby made into a slurry. The slurry was then coated on a collector made of copper foil to thereby form a negative electrode plate. Next, a rechargeable lithium half-type cell was prepared using the negative electrode plate together with a current electrode plate made of lithium metal foil and electrolyte of 1M $LiPF_6$ in an organic solvent of ethylene carbonate and dimethyl carbonate. The initial discharge capacity and initial charge and discharge efficiency (discharge capacity/charge capacity) were measured and the results are presented in Table 1. In Table 1, "Ex." refers to the indicated Example and "Com." refers to the indicated Comparative example.

TABLE 1

| | Graphitization temperature [° C.] | Boron compound type, [wt %] | Initial discharge capacity [mAh/g] | Initial charge and discharge efficiency [%] | $D_{002}$ [Å] |
|---|---|---|---|---|---|
| Ex. 1 | 2800 | $H_3BO_3$, 5 | 340 | 90 | 3.355 |
| Ex. 2 | 2600 | $H_3BO_3$, 5 | 325 | 93 | 3.356 |
| Ex. 3 | 2400 | $H_3BO_3$, 5 | 330 | 91 | 3.362 |
| Ex. 4 | 2200 | $H_3BO_3$, 5 | 310 | 91 | 3.368 |
| Ex. 5 | 2800 | $H_3BO_3$, 3 | 345 | 91 | 3.356 |
| Ex. 6 | 2600 | $H_3BO_3$, 3 | 346 | 94 | 3.358 |
| Ex. 7 | 2400 | $H_3BO_3$, 3 | 334 | 92 | 3.362 |
| Ex. 8 | 2200 | $H_3BO_3$, 3 | 314 | 91 | 3.369 |
| Ex. 9 | 2800 | $B_2O_3$, 1 | 343 | 92 | 3.360 |
| Ex. 10 | 2600 | $B_2O_3$, 1 | 349 | 93 | 3.360 |
| Ex. 11 | 2400 | $B_2O_3$, 1 | 348 | 93 | 3.362 |
| Ex. 12 | 2200 | $B_2O_3$, 1 | 335 | 93 | 3.369 |
| Com. 1 | 2800 | No, 0 | 305 | 80 | 3.366 |
| Com. 2 | 2600 | No, 0 | 297 | 92 | 3.374 |
| Com. 3 | 2400 | No, 0 | 250 | 95 | 3.389 |
| Com. 4 | 2200 | No, 0 | 183 | 95 | 3.420 |

As shown in Table 1, the cells according to Examples 1–12 with boron has good initial discharge capacity and initial charge and discharge efficiency compared to the Comparative examples 1–16 without boron. The cells of Examples 1–12 have similar initial charge and discharge efficiency compared to Comparative examples 14. The planar distance of $d_{002}$ of active materials produced at same temperature is smaller in examples 1–12 than comparative examples 1–4. This result is caused by doping boron in graphite and shows that boron acts on a catalyst in the graphitization to increase the degree of graphitization and represses side reactions to thereby increase initial charge and discharge efficiency.

The characteristics of active materials and cells of Examples 1, 5 and 9, and Comparative examples 5, 9 and 13 were determined and the results are shown in Table 2.

TABLE 2

| | Boron addition method | Amount of boron added [wt %] | Discharge capacity [mAh/g] | Charge and Discharge efficiency [%] | Content of boron in the active material [wt %] |
|---|---|---|---|---|---|
| Example 1 | Wet method | $H_3BO_3$, 5 | 340 | 90 | 4.55 ($B_4C$) |
| Example 5 | Wet method | $H_3BO_3$, 3 | 345 | 91 | 2.70 |
| Example 9 | Wet method | $H_3BO_3$, 1 | 343 | 92 | 0.76 |
| Com. 5 | Dry method | $H_3BO_3$, 5 | 332 | 87 | 6.35 ($B_4C$) |
| Com. 9 | Dry method | $H_3BO_3$, 3 | 321 | 92 | 2.24 |
| Com. 13 | Dry method | $B_2O_3$, 1 | 296 | 91 | 0.5 |

As shown in Table 2, the content of boron in graphite is higher when using the wet method (Examples 1, 5 and 9) than when using the dry method (Comparative examples 5, 9 and 13) with the same amount of boron added to graphite. A higher content of boron in graphite in the cell results in increases in the discharge capacity and charge and discharge efficiency of the cell. However, when the content of boron is greatly enlarged (Example 1 and Comparative example 5), the excess of boron is converted into a boron compound such as $B_4C$, which deteriorates the charge and discharge performances.

EXAMPLE 13

Coal pitch was treated with tetrahydrofuran to remove the tetrahyrdofuran-insoluble components. As a result, tetrahydrofuran-soluble pitch was obtained. 80 g of the tetrahydrofuran-soluble pitch and $H_3BO_3$ were added to 2 l of tetrahydrofuran solvent to prepare a mixed solution. At this time, the amount of $H_3BO_3$ was 5 wt % of the soluble pitch. The mixed solution was evaporated to remove tetrahydrofuran. The resulting mixture was heat-treated at 430° C. for 8 hours in an inert gaseous atmosphere to produce a mesophase pitch. The mesophase pitch was melt-spun at a rate 300 to 800 m/min through a spinning nozzle having a diameter of 0.3 mm to maintain a fibrous diameter of 10 μm at a spinning point of 250° C. which is a temperature about 50° C. higher than the softening point of the mesophase pitch.

The fibrous material was heated to 350° C. for 2 hours in an oven increased at a rate 3° C./min in an oxidation air atmosphere. The heated fibrous material was milled and the milled material was sieved to collect a resulting material having a size of 25–45 μm. The sieved material was carbonized at 1000° C. for 2 hours. The carbonized material was graphitized at 2800° C. in an argon atmosphere. As a result, a boron-doped carbonaceous active material was obtained.

EXAMPLE 14

A boron-doped carbonaceous active material was produced by the same procedure in Example 13 except that the graphitization step was performed at 2600° C.

EXAMPLE 15

A boron-doped carbonaceous active material was produced by the same procedure in Example 14 except that the graphitization step was performed at 2400° C.

EXAMPLE 16

A boron-doped carbonaceous active material was produced by the same procedure in Example 13 except that the graphitization step was performed at 2200° C.

EXAMPLE 17

A boron-doped carbonaceous active material was produced by the same procedure in Example 13 except that a first solution including tetrahydrofuran-soluble pitch was mixed with a second solution including $H_3BO_3$ to produce a mixed solution. The first solution was prepared by dissolving 80 g of the tetrahydrofuran-soluble pitch in 500 ml of tetrahydrofuran and the second solution was prepared by dissolving $H_3BO_3$ corresponding to 3 wt % of the soluble pitch in 200 ml of methanol and distributing.

EXAMPLE 18

A boron-doped carbonaceous active material was produced by the same procedure in Example 17 except that the graphitization step was performed at 2600° C.

EXAMPLE 19

A boron-doped carbonaceous active material was produced by the same procedure in Example 17 except that the graphitization step was performed at 2400° C.

EXAMPLE 20

A boron-doped carbonaceous active material was produced by the same procedure in Example 17 except that the graphitization step was performed at 2200° C.

EXAMPLE 21

A boron-doped carbonaceous active material was produced by the same procedure in Example 13 except that $B_2O_3$ corresponding to 1 wt % of the soluble pitch was used.

EXAMPLE 22

A boron-doped carbonaceous active material was produced by the same procedure in Example 14 except that $B_2O_3$ corresponding to 1 wt % of the soluble pitch was used.

EXAMPLE 23

A boron-doped carbonaceous active material was produced by the same procedure in Example 15 except that $B_2O_3$ corresponding to 1 wt % of the soluble pitch was used.

EXAMPLE 24

A boron-doped carbonaceous active material was produced by the same procedure in Example 16 except that $B_2O_3$ corresponding to 1 wt % of the soluble pitch was used.

EXAMPLE 25

Coal pitch was treated with tetrahydrofuran to remove the tetrahyrdofuran-insoluble components. As a result, tetrahydrofuran-soluble pitch was obtained. 80 g of the tetrahydrofuran-soluble pitch and $H_3BO_3$ were added to 2 l of tetrahydrofuran solvent to prepare a mixed solution. At this time, the amount of $H_3BO_3$ was 1 wt % of the soluble pitch. The mixed solution was evaporated to remove tetrahydrofuran. The resulting mixture was heat-treated at 430° C. for 8 hours in an inert gaseous atmosphere to produce a mesophase pitch. The mesophase pitch was melt-blowed at a rate 300 to 800 m/min through a spinning nozzle having a diameter of 0.3 mm to maintain a fibrous diameter of 10 μm at a spinning point of 300° C.

The fibrous material was heated to 350° C. for 2 hours in an oven increased at a rate 3° C./min in an oxidation air atmosphere. The heated fibrous material was milled and the milled material was sieved to collect a resulting material having a size of 25–45 μm. The sieved material was carbonized at 1000° C. for 2 hours. The carbonized material was graphitized at 2800° C. in an argon atmosphere. As a result, a boron-doped carbonaceous material was obtained.

EXAMPLE 26

A boron-doped carbonaceous active material was produced by the same procedure in Example 22 except that graphitization step was performed at 2600° C.

EXAMPLE 27

A boron-doped carbonaceous active material was produced by the same procedure in Example 22 except that graphitization step was performed at 2400° C.

EXAMPLE 28

A boron-doped carbonaceous active material was produced by the same procedure in Example 22 except that graphitization step was performed at 2200° C.

COMPARATIVE EXAMPLE 17

Coal pitch was treated with tetrahydrofuran to remove the tetrahyrdofuran-insoluble components. As a result, tetrahydrofuran-soluble pitch was obtained. The tetrahydrofuran-soluble pitch was heat-treated at 430° C. for 8 hours i n an inert gaseous atmosphere to produce a mesophase pitch. The mesophase pitch was melt-blowed at a rate 300 to 800 m/min through a spinning nozzle having a diameter of 0.3 mm to maintain a fibrous diameter of 10 μm at a spinning point of 300° C.

The fibrous material was heated to 350° C. for 2 hours in an oven increased at a rate 3° C./min in an oxidation air atmosphere. The heated fibrous material was milled and the milled material was sieved to collect a resulting material having a size of 25–45 μm. The sieved material was carbonized at 1000° C. for 2 hours. The carbonized material was graphitized at 2800° C. in an argon atmosphere. As a result, a carbonaceous active material was obtained.

COMPARATIVE EXAMPLE 18

A carbonaceous active material was produced by the same procedure in Comparative example 17 except that the graphitizing step was performed at 2600° C.

COMPARATIVE EXAMPLE 19

A carbonaceous active material was produced by the same procedure in Comparative example 17 except that the graphitizing step was performed at 2400° C.

COMPARATIVE EXAMPLE 20

A carbonaceous active material was produced by the same procedure in Comparative example 17 except that the graphitizing step was performed at 2200° C.

COMPARATIVE EXAMPLE 21

Coal pitch was treated with tetrahydrofuran to remove the tetrahyrdofuran-insoluble components. As a result, tetrahydrofuran-soluble pitch was obtained. The tetrahydrofuran-soluble pitch was heat-treated at 430° C. for 8 hours in an inert gaseous atmosphere to produce a mesophase pitch. The mesophase pitch was melt-blowed at a rate 300 to 800 m/min through a spinning nozzle having a diameter of 0.3 mm to maintain a fibrous diameter of 10 μm at a spinning point of 300° C.

The fibrous material was heated to 350° C. for 2 hours in an oven increased at a rate 3° C./min in an oxidation air atmosphere. $H_3BO_3$ corresponding to 5 wt % of the tetrahydrofuran-soluble pitch was added to the heated fibrous material. The resulting mixture was carbonized at 1000° C. for 2 hours. The carbonized material was milled and the milled material was sieved to collect a resulting material having a size of 25–45 μm. The collected material was carbonized at 1000° C. for 2 hours. The carbonized material was graphitized at 2800° C. in an argon atmosphere. As a result, a boron-doped carbonaceous active material was obtained.

COMPARATIVE EXAMPLE 22

A boron-doped carbonaceous active material was produced by the same procedure in Comparative example 21 except that the graphitizing step was performed at 2600° C.

COMPARATIVE EXAMPLE 23

A boron-doped carbonaceous active material was produced by the same procedure in Comparative example 21 except that the graphitizing step was performed at 2400° C.

COMPARATIVE EXAMPLE 24

A boron-doped carbonaceous active material was produced by the same procedure in Comparative example 21 except that the graphitizing step was performed at 2200° C.

COMPARATIVE EXAMPLE 25

A boron-doped carbonaceous active material was produced by the same procedure in Comparative example 21 except that the amount of $H_3BO_3$ was 3 wt % of the soluble pitch.

COMPARATIVE EXAMPLE 26

A boron-doped carbonaceous active material was produced by the same procedure in Comparative example 22 except that the amount of $H_3BO_3$ was 3 wt % of the soluble pitch.

COMPARATIVE EXAMPLE 27

A boron-doped carbonaceous active material was produced by the same procedure in Comparative example 23 except that the amount of $H_3BO_3$ was 3 wt % of the soluble pitch.

COMPARATIVE EXAMPLE 28

A boron-doped carbonaceous active material was produced by the same procedure in Comparative example 24 except that the amount of $H_3BO_3$ was 3 wt % of the soluble pitch.

COMPARATIVE EXAMPLE 29

A boron-doped carbonaceous active material was produced by the same procedure in Comparative example 21 except that the amount of $B_2O_3$ was 3 wt % of the soluble pitch.

COMPARATIVE EXAMPLE 30

A boron-doped carbonaceous active material was produced by the same procedure in Comparative example 22 except that the amount of $B_2O_3$ was 1 wt % of the soluble pitch.

COMPARATIVE EXAMPLE 31

A boron-doped carbonaceous active material was produced by the same procedure in Comparative example 23 except that the amount of $B_2O_3$ was 1 wt % of the soluble pitch.

COMPARATIVE EXAMPLE 32

A boron-doped carbonaceous active material was produced by the same procedure in Comparative example 24 except that the amount of $B_2O_3$ was 1 wt % of the soluble pitch.

The X-ray planar distance of $d_{002}$ of the carbonaceous materials of Examples 13 to 28 and Comparative examples 17 to 20 were determined and the results are presented in Table 3. Furthermore, each of the carbonaceous materials according to Examples 13 to 28 and Comparative examples 17 to 31, 10 wt % of a polyvinylidene fluoride binder and N-methyl pyrrolidone were mixed to be thereby made into a slurry. The slurry was then coated on a collector made of copper foil to thereby form a negative electrode plate. Next, a rechargeable lithium half-type cell was prepared using the negative electrode plate together with a current electrode plate made of lithium metal foil and electrolyte of 1M $LiPF_6$ in an organic solvent of ethylene carbonate and dimethyl carbonate. The initial discharge capacity and initial charge and discharge efficiency (discharge capacity/charge capacity) were measured and the results are presented in Table 3. In Table 3, "Ex." refers to the indicted Example and "Com." refers to the indicated Comparative example.

TABLE 3

| | Graphitization temperature [° C.] | Boron compound type, [wt %] | Initial discharge capacity [mAh/g] | Initial charge and discharge efficiency [%] | $d_{002}$ [Å] |
|---|---|---|---|---|---|
| Ex. 13 | 2800 | $H_3BO_3$, 5 | 328 | 90 | 3.353 |
| Ex. 14 | 2600 | $H_3BO_3$, 5 | 325 | 93 | 3.356 |
| Ex. 15 | 2400 | $H_3BO_3$, 5 | 330 | 91 | 3.361 |
| Ex. 16 | 2200 | $H_3BO_3$, 5 | 309 | 90 | 3.365 |
| Ex. 17 | 2800 | $H_3BO_3$, 3 | 345 | 91 | 3.358 |
| Ex. 18 | 2600 | $H_3BO_3$, 3 | 344 | 93 | 3.359 |
| Ex. 19 | 2400 | $H_3BO_3$, 3 | 334 | 92 | 3.362 |
| Ex. 20 | 2200 | $H_3BO_3$, 3 | 317 | 91 | 3.368 |
| Ex. 21 | 2800 | $B_2O_3$, 1 | 343 | 92 | 3.360 |
| Ex. 22 | 2600 | $B_2O_3$, 1 | 344 | 93 | 3.362 |
| Ex. 23 | 2400 | $B_2O_3$, 1 | 348 | 93 | 3.362 |
| Ex. 24 | 2200 | $B_2O_3$, 1 | 335 | 92 | 3.369 |
| Ex. 25 | 2800 | $B_2O_3$, 1 | 340 | 93 | 3.357 |
| Ex. 26 | 2600 | $B_2O_3$, 1 | 345 | 93 | 3.360 |
| Ex. 27 | 2400 | $B_2O_3$, 1 | 345 | 92 | 3.361 |
| Ex. 28 | 2200 | $B_2O_3$, 1 | 330 | 93 | 3.365 |
| Com. 17 | 2800 | No, 0 | 300 | 90 | 3.368 |
| Com. 18 | 2600 | No. 0 | 290 | 92 | 3.371 |
| Com. 19 | 2400 | No, 0 | 238 | 93 | 3.385 |
| Com. 20 | 2200 | No, 0 | 180 | 93 | 3.421 |

As shown in Table 3, the cells according to Examples 13–28 with boron has good initial discharge capacity and initial charge and discharge efficiency compared to Comparative examples 17–20 without boron. In addition, the planar distance of $d_{002}$ of the active materials is shorter in Examples 13–28 than in Comparative examples 17–20, when the active materials were produced at the same temperature. This result is caused by doping boron in graphite and shows that boron acts on a catalyst in the graphitization to increase the degree of graphitization and represses side reactions to thereby increase initial discharge and efficiency.

The characteristics of active materials and cells of Examples 13, 17, 21 and 25, and Comparative examples 21, 25 and 29 were determined and the results are shown in Table 4.

TABLE 4

| | Boron addition method | Amount of boron added [wt %] | Discharge capacity [mAh/g] | Discharge efficiency [%] | Content of boron in the active material [wt %] |
|---|---|---|---|---|---|
| Ex. 13 | Wet method | $H_3BO_3$, 5 | 328 | 90 | 4.81 ($B_4C$) |
| Ex. 17 | Wet method | $H_3BO_3$, 3 | 345 | 91 | 2.82 |
| Ex. 21 | Wet method | $B_2O_3$, 1 | 343 | 92 | 0.82 |
| Ex. 25 | Wet method | $B_2O_3$, 1 | 340 | 93 | 0.88 |
| Com. 21 | Dry method | $H_3BO_3$, 5 | 340 | 87 | 6.55 ($B_4C$) |
| Com. 25 | Dry method | $H_3BO_3$, 3 | 332 | 92 | 2.35 |
| Com. 29 | Dry method | $B_2O_3$, 1 | 320 | 90 | 0.48 |

As shown in Table 4, the content of boron in graphite is higher when using the wet method (Examples 13, 17 and 21) than when using the dry method (Comparative examples 21, 25 and 29) with the same amount of boron added to graphite. A higher content of boron in graphite in the cell results in increases in the discharge capacity and charge and discharge efficiency of the cell. However, when the content of boron is greatly enlarged (Example 13 and Comparative example 21), the excess of boron is converted into a boron compound such as $B_4C$, which deteriorates the charge and discharge performances.

Furthermore, each of the carbonaceous materials according to Examples 5 and 17, and Comparative examples 1 and 17, 10 wt % of a polyvinylidene fluoride binder and N-methyl pyrrolidone were mixed to be thereby made into a slurry. The slurry was then coated on a collector made of copper foil to thereby form a negative electrode plate. Next, a rechargeable lithium half-type cell was prepared using the negative electrode plate together with a current electrode plate made of lithium metal foil and electrolyte of 1M $LiPF_6$ in an organic solvent of ethylene carbonate, dimethyl carbonate and propylene carbonate. The initial discharge capacity and initial charge and discharge efficiency (discharge capacity/charge capacity) were measured and the results are presented in Table 5.

TABLE 5

| | Example 5 | Example 17 | Comparative example 1 | Comparative example 17 |
|---|---|---|---|---|
| Electrolyte | Ethylene carbonate/dimethylene carbonate | | | |
| Initial discharge capacity [mAh/g] | 345 | 345 | 305 | 300 |
| Discharge efficiency [%] | 91 | 91 | 80 | 90 |
| Electrolyte | Ethylene carbonate/dimethylene carbonate/propylene carbonate | | | |
| Initial discharge capacity [mAh/g] | 342 | 343 | 293 | 296 |
| Discharge efficiency [%] | 89 | 90 | 51 | 87 |

As shown in Table 5, the cells manufactured using the active material of Examples 5 and 17 and ethylene carbonate/dimethylene carbonate or ethylene carbonate/dimethylene carbonate/propylene carbonate, have good initial discharge capacity and discharge efficiency, compared with Comparative examples 1 and 17.

Particularly, when the active material of Example 5 is compared with the Comparative example 1, the cell manufactured using propylene carbonate and the active material of Example 5 has an excellent initial discharge capacity and discharge efficiency. This is realized by repressing the reaction of the active material and the electrolyte as a result of the reduced edge portion of the active material of the present invention. The edge portion of active material of Example 5 (shapeless artificial graphite) is rolled such that the edge portion is not exposed to an electrolyte. Accordingly, side reactions between the active material and electrolyte hardly occur during the initial charge and discharge when compared with the active material of Comparative example 1, an edge portion of which is exposed to electrolyte.

EXAMPLE 29

A boron-doped carbonaceous active material was produced by the same procedure in Example 1 except that the mesophase pitch including 3 wt % of boron obtained in the Example 17 was charged into a furnace for graphitizing and the resulting pitch was graphitized at 2400° C. for 30 minutes. In the resulting pitch, the air was maintained between carbon particles.

COMPARATIVE EXAMPLE 32

A carbonaceous material was produced by the same procedure in Example 1 except that carbon powder processed from the tetrahydrofuran-soluble pitch precursor and 3 wt % of boron compound was mixed, charged into a furnace for graphitizing and graphitized at 2400° C.

The initial discharge capacity and initial discharge efficiency of Example 29 and Comparative example 32 were measured and the results are shown in Table 6. Furthermore, the hetero-compound in the carbonaceous material of Example 29 and Comparative example 32 were measured by XPS and SIMS analysis. The results are also presented in Table 6.

TABLE 6

|  | Boron nitride | Electrolyte | Initial discharge capacity [mAh/g] | Initial discharge efficiency [%] | Electrolyte | Initial discharge capacity [mAh/g] | Initial discharge efficiency [%] |
|---|---|---|---|---|---|---|---|
| Ex. | No | EC/DMC/DEC | 343 | 91 | EC/DMC/D EC/PC | 342 | 90 |
| Com. | Yes |  | 292 | 82 |  | 245 | 56 |

As shown Table 6, when the boron-based compound powder is mixed with the carbonaceous material power by the method of Comparative example 32, boron reacted with carbon to generate boron nitride such that battery performance deteriorate. In the other words, when boron-based compound solution is mixed with the carbonaceous material solution by the method of Example 29, boron is distributed in the carbonaceous material. Accordingly, boron is does not easily make contact with nitrogen as a result of the surface layer of carbon, thereby preventing the formation of boron nitride.

The present invention can uniformly dope boron in and on graphite by a simple wet method. The boron-included pitch is prepared by mixing the pitch with the boron compound in the solution. Owing to the presence of boron in and on graphite, the graphitization temperature decreases and the production cost decreases. Furthermore, propylene carbonate, which is normally difficult to use in the graphite active material, can be used in the present invention. Therefore, the active material of the present invention is economical and can be used to provide a battery having a good initial discharge capacity and charge and discharge efficiency.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A method of preparing a negative active material for a rechargeable lithium battery comprising, the steps of:

preparing a mixed solution comprising a pitch, a boron compound and solvents, the boron being selected from the group consisting of $H_3BO_3$, $B_2O_3$ and a mixture thereof removing the solvent from the mixed solution;

heat-treating the resulting mixture to produce a mesophase pitch;

carbonizing the mesophase pitch; and graphitizing the carbonized mesophase pitch.

2. The method of claim 1 wherein the step of preparing the mixed solution is performed by dissolving the pitch and the boron compound in the solvent.

3. The method of claim 1 wherein the solvent is tetrahydrofuran or toluene.

4. The method of claim 1 wherein the step of preparing the mixed solution is performed by mixing a first solution with a second solution, the first solution being prepared by dissolving the pitch in a first solvent and the second solution being prepared by dissolving the boron compound in a second solvent.

5. The method of claim 4 wherein the first solvent is selected from the group consisting of tetrahydrofuran, toluene, quinoline, pyridine and the mixture thereof and the second solvent is selected from the group consisting of ethanol, methanol, isopropyl alcohol and the mixture thereof.

6. The method of claim 1 wherein the amount of boron compound is 0.1 to 10 wt % of the pitch.

7. The method of claim 1 wherein the heat-treating step is performed at a temperature of 300 to 450° C., the carbonizing step is performed at a temperature of 1000 to 1700° C. and the graphitizing step is performed at a temperature of 2200 to 2800° C. in an argon inert atmosphere, and nitrogen or air atmosphere.

8. The method of claim 1 further comprising the steps of melt spinning or melt blowing the mesophase pitch to prepare a fibrous material and hardening fibrous material and milling the hardened fibrous material before the carbonizing step.

9. The method of claim 8 wherein the hardening step is perfomred at a temperature of 330 to 370° C. in an air atmosphere.

10. A negative active material for a rechargeable lithium battery, formed by the method of claim 1, comprising 0.1 to 5 wt % of boron and having in an X-ray diffraction analysis, a planar distance of $d_{002} \leq 3.40$ Å at a (002) plane and a crystallinity size of $L_c \geq 400$ Å.

11. A negative active material for a rechargeable lithium battery, formed by the method of claim 1, comprising an amorphous graphite having an edge rolled with an onion sheath structure such that an interlayer spacing of the graphite is closed.

* * * * *